United States Patent [19]

Shaw et al.

[11] Patent Number: 4,560,234

[45] Date of Patent: Dec. 24, 1985

[54] FIBER OPTIC SWITCHABLE COUPLER

[75] Inventors: Herbert J. Shaw, Stanford; Ralph A. Bergh; Michel J. F. Digonnet, both of Palo Alto, all of Calif.

[73] Assignee: Board of Trustees of the Leland Stanford Junior University, Stanford, Calif.

[21] Appl. No.: 523,150

[22] Filed: Aug. 15, 1983

[51] Int. Cl.⁴ ............................................. G02B 5/174
[52] U.S. Cl. .................... 350/96.15; 350/96.13; 350/96.20
[58] Field of Search ................ 350/96.2, 96.12, 96.13, 350/96.14, 96.15, 96.16

[56] References Cited

U.S. PATENT DOCUMENTS

| | | | |
|---|---|---|---|
| 3,456,211 | 7/1969 | Koester | 372/6 |
| 3,957,341 | 5/1976 | Taylor | 350/96 C |
| 4,136,929 | 1/1979 | Suzaki | 350/96.15 |
| 4,211,467 | 7/1980 | Cross et al. | 350/96.14 |
| 4,243,297 | 1/1981 | Elion | 350/96.15 |
| 4,258,336 | 3/1981 | Fletcher et al. | 356/350 |
| 4,300,811 | 11/1981 | Ettenberg et al. | 350/1.1 |
| 4,301,543 | 11/1981 | Palmer | 350/96.15 |
| 4,307,933 | 12/1981 | Palmer et al. | 350/96.16 |
| 4,315,666 | 2/1982 | Hicks, Jr. | 350/96.15 |
| 4,335,933 | 6/1982 | Palmer | 350/96.19 |
| 4,342,499 | 8/1982 | Hicks, Jr. | 350/96.15 |
| 4,343,532 | 8/1982 | Palmer | 350/96.19 |
| 4,362,359 | 12/1982 | Dammann | 350/96.19 |
| 4,383,318 | 5/1983 | Barry et al. | 350/96.24 |
| 4,491,384 | 1/1985 | Yamashita et al. | 350/96.13 |
| 4,493,528 | 1/1985 | Shaw et al. | 350/96.15 |

FOREIGN PATENT DOCUMENTS

| | | |
|---|---|---|
| 038023 | 10/1981 | European Pat. Off. |
| 53-91752 | 11/1978 | Japan |
| 55-76308 | 6/1980 | Japan |
| 0085004 | 5/1982 | Japan ............... 350/96.13 |
| 1094639 | 12/1967 | United Kingdom |

OTHER PUBLICATIONS

Kaminow, Stulz and Turner, Efficient Strip-Waveguide Modulator, Nov. 15, 1975, Applied Physics Letters, vol. 27, pp. 555-557.
H. Injeyan et al., "Light Amplification by Evanescent Wave Coupling in Multimode Fiber", *Applied Optics*, vol. 21; No. 11, Jun. 1, 1982, pp. 1928-1932.
Digonnet et al., "Analysis of a Tunable Single Mode Optical Fiber Coupler", IEEE Journal of Quantum Electronics, vol. QE-18, No. 4, Apr. 1982.
Bergh et al., *Electronic Letters*, vol. 16, No. 7, Mar. 27, 1980, "Single Mode Fiber Optic Directional Coupler", pp. 260-261.
Kapany et al., Journal of the Optical Society of America, vol. 58, No. 9, Sep. 1968, "Coherent Interactions Between Optical Waveguides, etc."
Periasamy et al., *Applied Physics*, vol. 24, No. 3, Mar. 1981, pp. 201-203, "Laser Amplification in an Optical Fiber by Evanescent Field Coupling".

*Primary Examiner*—John Lee
*Assistant Examiner*—Lester Rushin
*Attorney, Agent, or Firm*—Knobbe, Martens, Olson & Bear

[57] ABSTRACT

A pair of optical couplers are arranged in series with a pair of outputs from the first optical coupler supplying the pair of inputs to the second optical coupler. At least one of the optical fibers between the first and second couplers is arranged to have a variable length, said variation being at least one-half the wavelength of the light signal utilized within the system. When light is supplied to one input of the first coupler, this light can be switched selectively to either of the outputs of the second coupler by varying the length of one of the optical fibers between the couplers. Thus, a light signal supplied to either of the inputs of the first coupler can be selectively output at either of the outputs of the second coupler or can be made to alternate between these outputs in accordance with the length of the intervening optical fiber.

17 Claims, 16 Drawing Figures

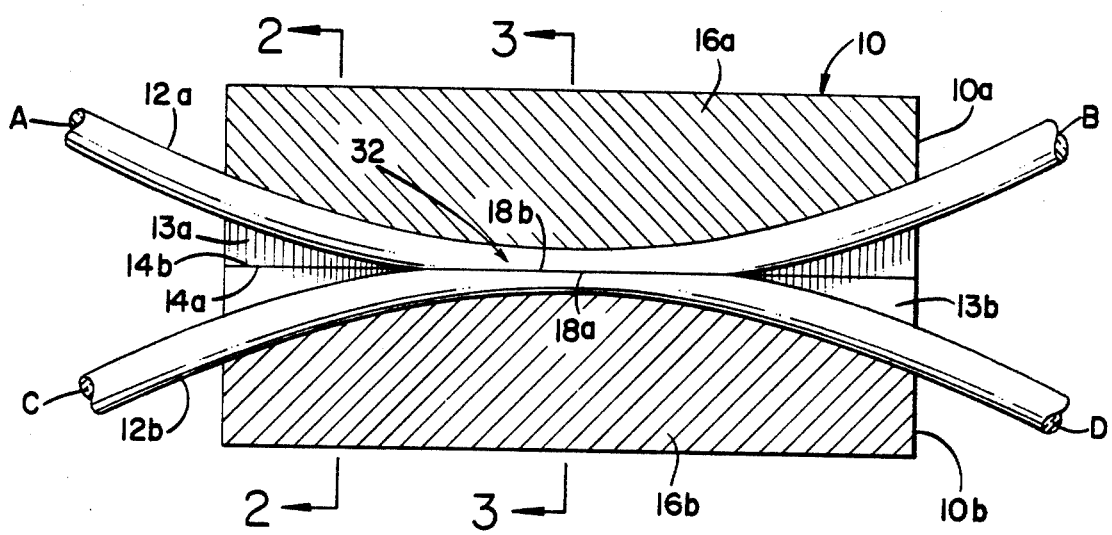
Fig. 1
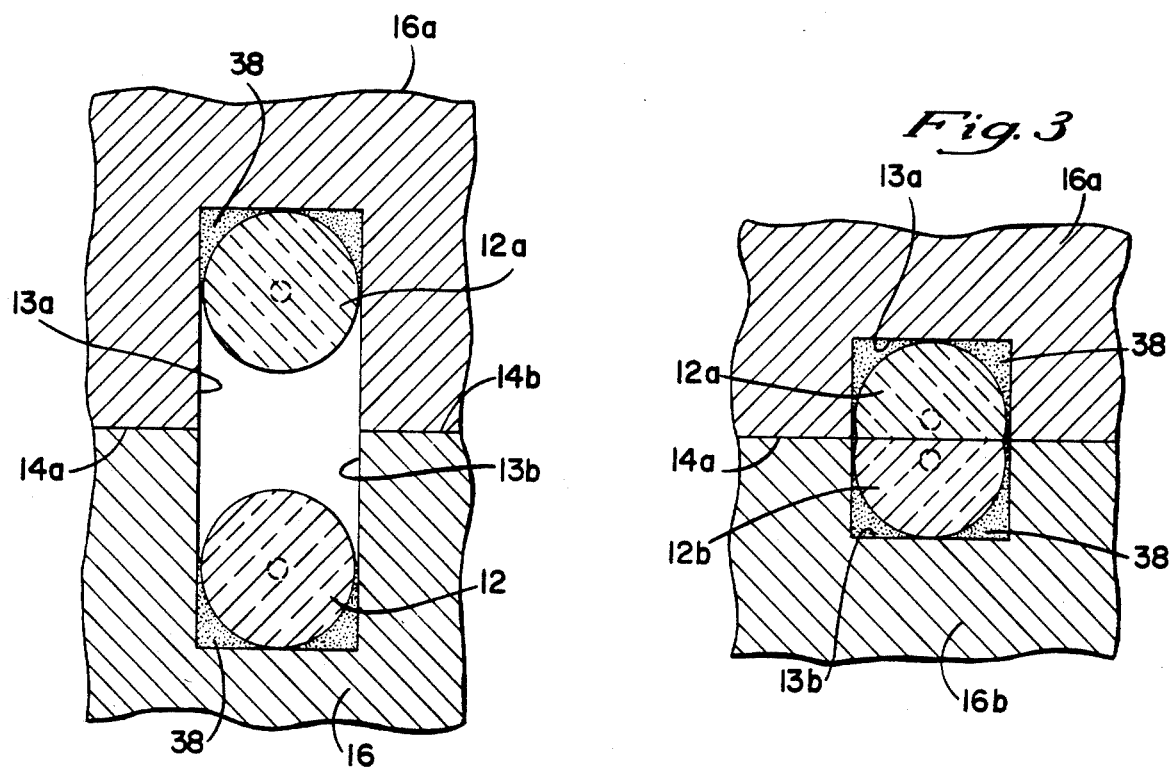
Fig. 2
Fig. 3
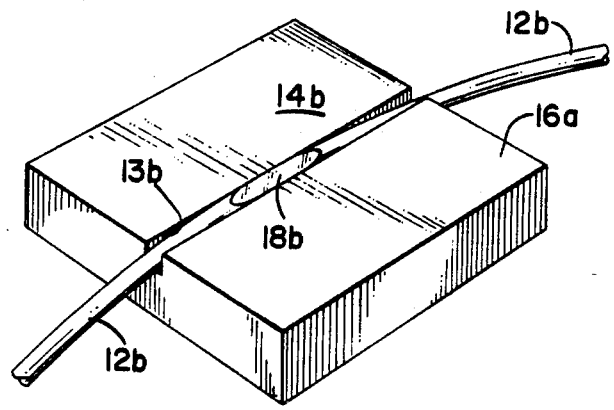
Fig. 4

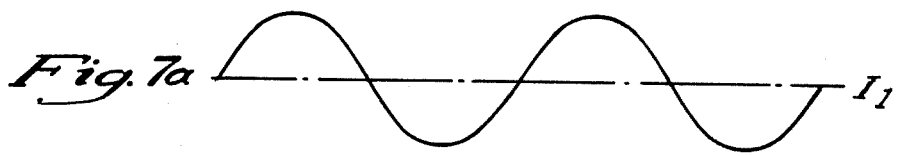
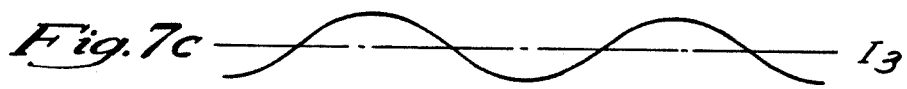
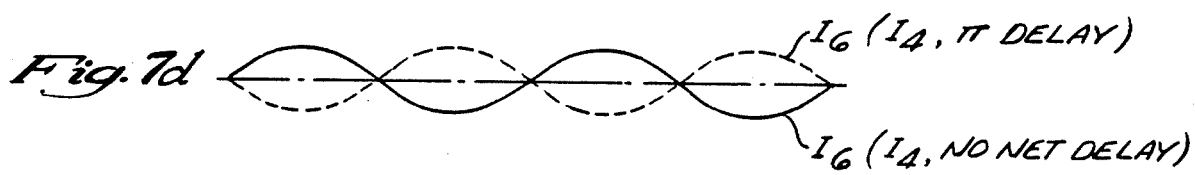
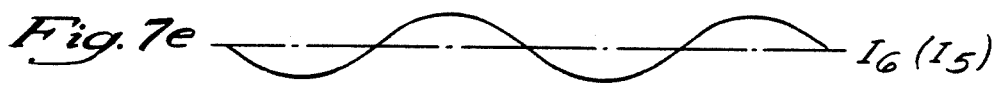
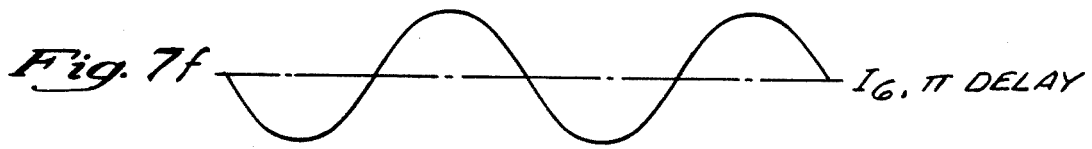
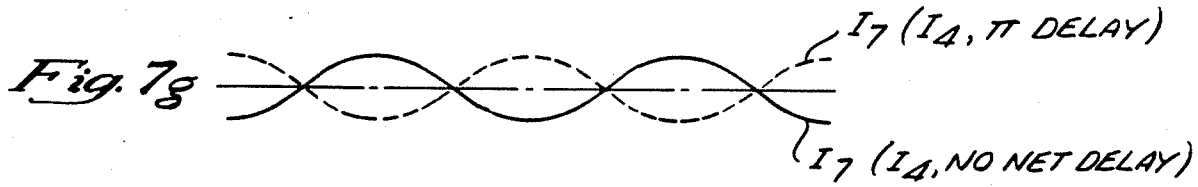
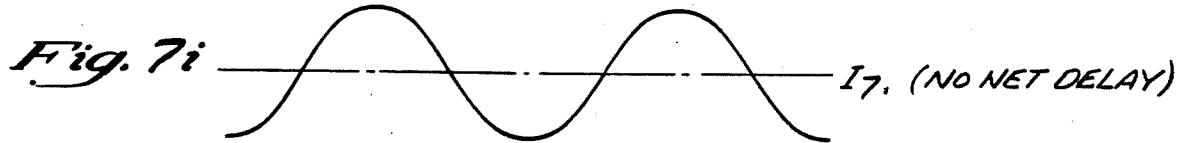

FIBER OPTIC SWITCHABLE COUPLER

BACKGROUND OF THE INVENTION

This invention relates to active devices for multiplexing or switching optical signals in fiber optic systems, and specifically to a switchable coupler which selectively couples light from an input optical fiber to either of two output optical fibers.

Fiber optic multiplexing or switching in the past has been accomplished using passive frequency selective couplers, such as that described in U.S. Pat. No. 3,957,341, in which a pair of coupled waveguides have different phase propagation constants at all frequencies except for the frequency to be coupled, yielding a separation of this frequency from all other frequencies. Such systems require careful material selection for the desired frequency separation and do not lend themselves to adjustment during or after manufacture to accomplish the separation of optical signals over a broad range of frequencies.

In addition, fiber optic multiplexing has been accomplished using active systems in which a pair of waveguides are surrounded by a crystal material which has a voltage responsive refractive index. Such systems are difficult to manufacture and typically have a fairly narrow bandwidth of operation.

There exists, therefore, a need for a fiber optic switch which provides high resolution switching of a pair of inputs to a single output, or of inputs on a pair of separate optical fibers to a single optical fiber, in which the system is capable of switching a broad range of optical frequencies. Furthermore, there exists a need to provide such optical switching in a system which permits adjustment for the frequency to be switched after the system is manufactured and assembled. Furthermore, it is desirable that such switching be accomplished with the lowest possible throughput loss so that system efficiency will not be unduly limited by losses in the switching device.

SUMMARY OF THE INVENTION

The present invention provides a fiber optic switching coupler system in which single mode optical fiber couplers are utilized to selectively couple a light input signal from a single input fiber to either of a pair of output fibers or, in the alternative, to selectively couple signals from either of a pair of input fibers to a single output optical fiber.

The switching system is based upon single mode optical fiber couplers in which a pair of single mode fibers are positioned adjacent to one another through a selectable interaction length to permit evanescent field coupling. When cladded single mode fibers are utilized in the construction of these couplers, the fibers are mounted in a pair of bases or blocks having respective arcuate grooves for mounting the respective strands of fiber optic material. Material is removed by simultaneously polishing the blocks and the strands until the desired amount of fiber optic material has been removed. The blocks are then positioned in a face-to-face relationship with the strands positioned in close proximity to each other, and with the cutaway portions of the fiber in facing relationship.

In order to ensure proper evanescent field coupling, the amount of material removed from the fibers must be carefully controlled so that the spacing between the core portions of the fibers is within a predetermined "critical zone". This causes each strand to receive a significant portion of the evanescent field energy from the other strand, and coupling is achieved without significant energy loss.

The coupler used in the switching assembly of the present invention may be adjusted so that the coupled power may be changed. In particular, the couplers used in the present invention are adjusted so that they couple 50% of the light entering each fiber to the other fiber in the fiber pair. This coupler adjustment is accomplished by translating the fibers so that their respective facing surfaces are slidingly offset relative to one another.

Because of the importance that a switching assembly have low loss or high efficiency, an important feature of the coupler used in this invention is its capability of achieving low throughput losses. Experimental results show that throughput losses of 0.2 db have been attained, although losses of 0.5 db are more common. In addition, the coupler has a high directivity with substantially all of the coupled power being delivered to the output side of the coupler. Tests have shown that the directionally coupled power is greater than 60 db above the contra-directionally coupled power.

In the system of the present invention, a pair of couplers is utilized. One of the optical fiber strands of the first coupler is used as an input for the switch. Since the couplers are adjusted to have a coupling efficiency of 50%, half of the input light is output on each of the optical fiber strands at the output side of this first coupler. An important characteristic of the coupler is the fact that the coupled light lags in phase by 90° with respect to the uncoupled light at the output side of the coupler, assuming that the fiber optic strands each have the same length. Thus, at the interaction region within the coupler, the light coupled from one fiber to the other is phase shifted. As a consequence, although half of the light appears at each of the optical fibers on the output side of this first coupler, a 90° phase relationship exists between the light outputs.

One of the fibers from the output side of the first coupler may be coupled directly to one of the fibers at the input side of the second coupler. In fact, throughput losses for the switching device are minimized if only two fibers are used in the device, such that a single fiber forms one of the optical fiber pairs for both couplers.

The second optical fiber at the output side of the first coupler is arranged to have a variable length before entering the input side of the second coupler. Thus, for example, this output fiber may be wound around a piezoelectric crystal before entering the input side of the second coupler. The piezoelectric crystal is an electromechanical transducer which changes in diameter in response to an applied electrical signal.

By properly adjusting the electrical signal supplied to the piezoelectric crystal, the pair of optical fibers entering the input side of the second optical coupler may each have a length equal to an even number of wavelengths of the light being switched. Alternatively, if the electrical signal at the piezoelectric crystal is changed, this pair of optical fibers may have a differential length which provides a relative phase shift of 180°. It will be recognized that, in order to accomplish this phase shift, it is not necessary that the two fibers between the pair of optical couplers have the same length, but only that one of the fibers have a length which is longer than the other optical fiber by a factor of $N\lambda + \frac{1}{2}\lambda$, where N is an even integer and λ is a wavelength of the light being switched.

Thus, depending upon the electrical signal supplied to the piezoelectric transducer, the difference in length between the pair of optical fibers is either $N\lambda$ or $N\lambda + \frac{1}{2}\lambda$ so that, in effect, the piezoelectric crystal can selectively induce a 180° phase differential between the light signals reaching the pair of inputs of the second optical coupler. Within the second optical coupler, coupled light is phase shifted with respect to uncoupled light by 90°, as explained previously. As a consequence of the phase shifts within the system, the illumination initially supplied to one of the optical fibers at the input side of the first coupler may be selectively output at either of the optical fibers at the output side of the second coupler. This occurs as a consequence of constructive or destructive interference of the lightwaves in the output optical fibers.

Thus, the output illumination on each of the optical fibers at the output side of the second coupler includes a contribution from each fiber at the input side of the second coupler, the contribution from one input fiber being coupled and the contribution from the other input fiber being uncoupled. If the phase relationship between these two contributions is constructive, the output will provide a virtually unattenuated light signal. If, however, the contributions destructively interfere, the output will provide virtually no light signal.

The phase relationship between the light signals on the pair of optical fibers at the input side of the second coupler is such that, when the piezoelectric crystal has a first electrical signal, the light signals will constructively add in one fiber at the output side of the second coupler and destructively cancel one another at the alternate output. When the signal at the piezoelectric transducer is changed to induce the 180° phase shift described above, the phase relationship at the output fibers of the second coupler will reverse, so that the alternate fiber outputs the light signal.

By inducing phase shifts other than 180° at the piezoelectric crystal, other combinations of output signals may be achieved so that, for example, the pair of output fibers may alternately carry all of the signal or each may carry a selected portion of the light signal.

Advantageously, the pair of optical fibers between the pair of optical couplers are made the same length, at least within the coherence length of the light signals being supplied to the switch, since this is necessary for constructive or destructive interference at the output coupler. In addition, because such interference only occurs between waves having identical polarization, polarization control may be advantageously provided in the switch to assure such interference.

BRIEF DESCRIPTION OF THE DRAWINGS

These and other advantages of the present invention are best understood through reference to the drawings, in which:

FIG. 1 is a cross-sectional view of the fiber optic coupler used in the fiber optic switch of the present invention showing a pair of fiber optic strands mounted in respective arcuate grooves of respective bases;

FIGS. 2 and 3 are cross-sectional views of the coupler of FIG. 1 taken along lines 2—2 and 3—3, respectively;

FIG. 4 is a perspective view of the lower base of the coupler of FIG. 1, separated from the other base, to show its associated fiber mounting and the oval-shaped facing surface of the fiber;

FIGS. 7a-7i are schematic representations of the light signals at various locations within the optical switch of FIG. 6.

DETAILED DESCRIPTION OF THE PREFERRED EMBODIMENT

Figure 5:
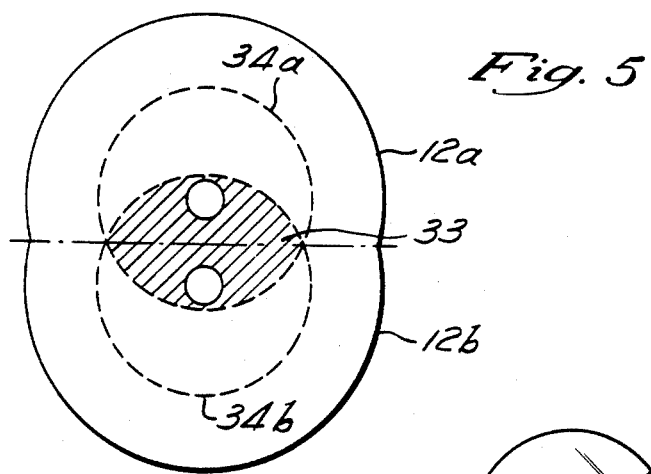
FIG. 5 is a schematic diagram showing the evanescent fields of the pair of fibers overlapping at the interaction region.

The fiber optic coupler, which is described below in reference to FIGS. 1-5, is disclosed and claimed in patent application Ser. No. 300,955, entitled "Fiber Optic Directional Coupler", filed Sept. 10, 1981, by Herbert J. Shaw and Ralph A. Bergh, and assigned to the assignee of the present invention.

In order to gain a detailed understanding of the operation of the optical fiber switch of this invention, it is necessary to understand the operation of the fiber optic coupler and the manner in which this coupler is constructed to selectively couple a predetermined portion of input light from one optical fiber to the other. This coupler 10 is illustrated in FIGS. 1-4 and includes two strands 12a and 12b of a single mode fiber optic material mounted in longitudinal arcuate grooves 13a and 13b, respectively, formed in optically flat, confronting surfaces 14a and 14b, respectively, of rectangular bases or blocks 16a and 16b, respectively. The block 16a with the strand 12a mounted in the groove 13a will be referred to as the coupler half 10a, and the block 16b with the strand 12b mounted in the groove 13b will be referred to as the coupler half 10b.

Each of the strands 12a and 12b comprise a commercially available fiber of quartz glass which is doped to have a central core and an outer cladding. The strands 12a and 12b are single mode fibers, which typically have a core diameter on the order of 10 microns or less and a cladding diameter on the order of 125 microns. In the embodiment disclosed, the diameter of the strands 12 and their respective cores are exaggerated.

The arcuate grooves 13a and 13b have a radius of curvature which is very large compared to the diameter of the fibers 12, and have a width slightly larger than the fiber diameter to permit the fibers 12, when mounted therein, to conform to a path defined by the bottom walls of the grooves 13. The depth of the grooves 13a and 13b varies from a minimum at the center of the blocks 16a and 16b, respectively, to a maximum at the edges of the blocks 16a and 16b, respectively. This advantageously permits the fiber optic strands 12a and 12b, when mounted in the grooves 13a and 13b, respectively, to gradually converge toward the center and diverge toward the edges of the blocks 16a, 16b, thereby eliminating any sharp bends or abrupt changes in direction of the fibers 12 which may cause power loss through mode perturbation. In the embodiment shown, the grooves 13 are illustrated as being rectangular in cross-section, however, it will be understood that other suitable cross-sectional contours which will accommodate the fibers 12 may be used alternatively, such as a U-shaped cross-section or a V-shaped cross-section.

At the centers of the blocks 16, in the embodiment shown, the depth of the grooves 13 which mount the strands 12 is less than the diameter of the strands 12, while at the edges of the blocks 16, the depth of the grooves 13 is preferably at least as great as the diameter of the strands 12. Fiber optic material was removed from each of the strands 12a and 12b to form the respective oval-shaped planar surfaces 18a, 18b, which are coplanar with the confronting surfaces 14a, 14b, respectively. These surfaces 18a, 18b will be referred to herein as the fiber "facing surfaces". Thus, the amount of fiber optic material removed increases gradually from zero towards the edges of the block 16 to a maximum towards the center of the block 16. This tapered removal of the fiber optic material enables the fibers to converge and diverge gradually, which is advantageous for avoiding backward reflection and excess loss of light energy.

In the embodiment shown, the coupler halves 10a and 10b are identical, and are assembled by placing the confronting surfaces 14a and 14b of the blocks 16a and 16b together, so that the facing surfaces 18a and 18b of the strands 12a and 12b are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

An interaction region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and good coupling is achieved without significant energy loss. The critical zone is illustrated schematically in FIG. 5 as including that area, designated by the reference numeral 33, in which the evanescent fields, designated by reference numerals 34a and 34b, of the fibers 12a and 12b, respectively, overlap with sufficient strength to provide coupling, i.e., each core is within the evanescent field of the other. However, as previously indicated, mode perturbation occurs within the area 33 when the cores are brought too close together. For example, it is believed that, for weakly guided modes, such as the $HE_{11}$ mode in single mode fibers, such mode perturbation begins to occur when sufficient material is removed from the fibers 12 to expose their cores. Thus, the critical zone is defined as that area in which the evanescent fields 34 overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 1–4, for example, the required center-to-center spacing between the strands 12 at the center of the coupler is typically less than a few (e.g., 2–3) core diameters.

Preferably, the strands 12a and 12b are (1) identical to each other, (2) have the same radius of curvature at the interaction region 32, and (3) have an equal amount of fiber optic material removed therefrom to form their respective facing surfaces 18a and 18b. Thus, the fibers 12 are symmetrical, through the interaction region 32, in the plane of the facing surfaces 18, so that the facing surfaces 18 are coextensive if superimposed. This insures that the two fibers 12a and 12b will have the same propagation characteristics at the interaction region 32, and thereby avoids coupling attenuation associated with dissimilar propagation characteristics.

The blocks or bases 12 may be fabricated of any suitable rigid material. In one presently preferred embodiment, the bases 12 comprise generally rectangular blocks of fused quartz glass approximately 1 inch long, 1 inch wide, and 0.4 inch thick. In this embodiment, the fiber optic strands 12 are secured in the slots 13 by suitable cement 38, such as epoxy glue. One advantage of the fused quartz blocks 16 is that they have a coefficient of thermal expansion similar to that of glass fibers, and this advantage is particularly important if the blocks 16 and fibers 12 are subjected to any heat treatment during the manufacturing process. Another suitable material for the block 16 is silicon, which also has excellent thermal properties for this application.

Operation of the Coupler 10

The coupler 10 includes four ports, labeled A, B, C, and D in FIG. 1. When viewed from the perspective of FIG. 1, ports A and C, which correspond to strands 12a and 12b, respectively, are on the left-hand side of the coupler 10, while the ports B and D, which correspond to the strands 12a and 12b, respectively, are on the right-hand side of the coupler 10. For the purposes of discussion, it will be assumed that input light is applied to port A. This light passes through the coupler and is output at port B and/or port D, depending upon the amount of power that is coupled between the strands 12. In this regard, the term "normalized coupled power" is defined as the ratio of the coupled power to the total output power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times 100. In this regard, tests have shown that the coupler 10 has a coupling efficiency of up to 100%. However, it will also be seen that the coupler 10 may be "tuned" to adjust the coupling efficiency to any desired value between zero and the maximum.

Furthermore, the coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at port D) is greater than 60 db above the contra-directionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A) subtracted from one (i.e., $1-(P_B+P_D)/P_A$). Experimental results show that throughput losses of 0.2 db have been obtained, although losses of 0.5 db are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32.

Optical Fiber Switch

Figure 6:
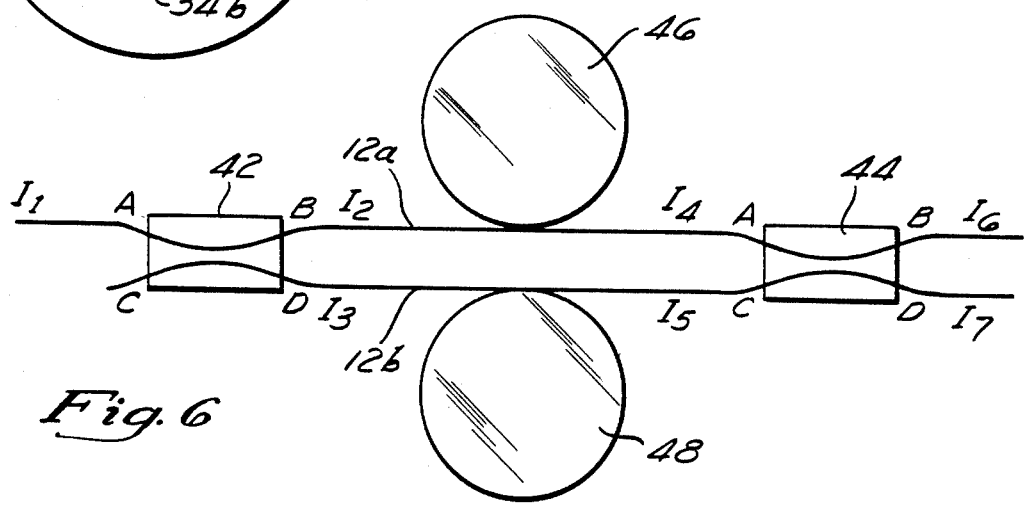
FIG. 6 is a schematic representation of the optical switch of the present invention utilizing a pair of couplers as shown in FIGS. 1-5.

Referring now to FIG. 6, a pair of optical fiber couplers 42 and 44, constructed in accordance with the description provided above in reference to FIGS. 1–5, each include a pair of input ports, labeled A and C, and a pair of output ports, labeled B and D.

For purposes of this discussion, it will be assumed that an input light signal is supplied to input port A of the coupler 42. This input light signal is designated $I_1$. Also for purposes of this discussion, it will be assumed that each of the couplers 42 and 44 are manufactured and properly adjusted so that their coupling efficiency is 50%. That is, 50% of the light signal $I_1$ will remain uncoupled to exit the coupler at port B. This signal is labeled $I_2$. The remaining 50% of the input illumination is coupled by the coupler 42 and is output at port D of the coupled 42, designated $I_3$.

Referring to FIG. 7a, the input light signal $I_1$ is shown as having a characteristic amplitude and phase. FIG. 7b shows that the uncoupled portion of the light signal $I_1$, which exits port B of the coupler 42, has the same relative phase as the signal $I_1$, but an amplitude which is 50% of the amplitude of the signal $I_1$. FIG. 7a shows that the light signal $I_3$ has an amplitude reduced by 50%, but is shifted in phase relative the signal $I_1$ by 90°. This phase shift occurs as a direct consequence of the coupling in the interaction region of the coupler 42.

It is important to note, with respect to FIGS. 7a, 7b, and 7c, and with respect to the remaining description of this invention, that the term "relative phase" assumes that the fiber length between the ports A and B is the same as the fiber length between the ports C and D. Thus, if one of these fibers is longer, an additional phase shift will appear between the ports B and D as a consequence of the length differential, and in accordance with the ratio of that length differential to the wavelength of light supplied at the input port A. Thus, the actual phase difference at the ports B and D will be a summation of the phase difference imposed by the differential length of the fibers, which should be kept to a minimum, and the 90° phase shift imposed by the coupling action of the coupler at the interaction region. For purposes of this discussion, an ideal system in which the fiber lengths are identical will be considered, and thus the phase shift may be considered to be 90°, as shown in FIGS. 7a and 7c. It will become apparent, however, through the description of FIG. 8, that the system need not have these local characteristics to operate.

The fiber 12a, which exits the coupler 42 at port B and carries the light signal $I_2$, is wrapped, at least once, around a cylindrical, radially polarized piezoelectric crystal 46, and continues through ports A and B of the coupler 44. The fiber 12B, after exiting port D of the coupler 42, is wrapped on a passive cylindrical mandrel 48, identical in shape to the piezoelectric crystal 46, and thereafter passes through ports C and D of the coupler 44. Thus, the switch assembly includes only the two fibers 12a and 12b in this exemplary embodiment, although it will be understood that, by splicing fibers together, the assembly shown in FIG. 6 may be constructed with multiple fiber segments, if the greater loss, which occurs at splices, is tolerable in the overall switching system.

Because, in the ideal system being described, the length of the fibers 12a and 12b between the couplers 42 and 44 is assumed to be identical, the relative phase relationship between the signals $I_4$ and $I_5$ at the input ports A and C, respectively, of the coupler 44 may be assumed to be identical to the phase relationship of the signals $I_2$ and $I_3$, shown respectively in FIGS. 7a and 7c. That is, the signal $I_5$ at port C of the coupler 44 lags the signal $I_4$ at port A of the coupler 44 by 90°.

The coupler 44 is also manufactured and adjusted to provide a 50% coupling efficiency. For this reason, the light output at port B, designated $I_6$, will include two components: (a) the uncoupled 50% of the light signal $I_4$ and (b) the coupled 50% of the light signal $I_5$. Likewise, the light signal output at port D, designated $I_7$, will include two components: (a) the uncoupled 50% of the light signal $I_5$ and (b) the coupled 50% of the light signal $I_4$. In each instance, the coupled component will be phase shifted by 90° at the interaction region of the coupler 44.

FIG. 7d shows, in solid lines, the component of the signal $I_6$ which results from the uncoupled 50% portion of the signal $I_4$, designated $I_6 (I_4)$. The FIG. 7e shows the component of the signal $I_6$ which results from the coupled 50% of the light signal $I_5$, designated $I_6 (I_5)$, which signal is 90° phase shifted from the signal $I_3$ of FIG. 7c. This relationship assumes, of course, that the length of the fiber 12a between the port B of the coupler 42 and port A of the coupler 44 is an even number of wavelengths of the signal being switched, and likewise, that the length of the fiber 12b between the port D of the coupler 42 and the port C of the coupler 44 is also an even number of wavelengths of the light frequency being switched, so that the phase of the signal $I_4$ is identical to the phase of the signal $I_2$ and, likewise, the phase of signal $I_5$ is identical to the phase of signal $I_3$. As will be seen from the description which follows, the length of the fibers 12a and 12b can be adjusted to achieve this relationship once the switch of FIG. 6 has been assembled.

From the phase diagrams of FIGS. 7d and 7e, it can be seen that the two components $I_6 (I_4)$ and $I_6 (I_5)$ are 180° out of phase, and thus, the signals will cancel, yielding no net light output from the port B of the coupler 44.

Under the circumstances described above, the light signal at port D of the coupler 44, $I_7$, includes two components. The first of these components is the uncoupled portion of the light signal $I_5$, shown in FIG. 7h as $I_7 (I_5)$. The other component of the signal $I_7$ is shown in solid lines in FIG. 7g as $I_7 (I_4)$, that is, the coupled 50% of the light signal $I_4$. It will be seen that the signals $I_7 (I_5)$ and $I_7 (I_4)$ are in phase, and thus constructively add to produce, at the output $I_7$, the signal shown in FIG. 7i, namely, the input signal $I_1$ shown in FIG. 7a, phase shifted by 90°. The light signal input at port A of the coupler 42, $I_1$, is thus output at the port D of the coupler 44, $I_7$, with no light output from port B of the coupler 44.

If a voltage is applied to the piezoelectric crystal 46, sufficient to stretch the fiber 12a to increase its length by one-half the wavelength of the $I_1$ supplied to the port A of the coupler 42, an additional 180° phase differential, $\pi$ delay, will be superimposed on the signals $I_2$ and $I_4$. This assumes, as previously described, that the unstretched length of the fiber 12a between port B of the coupler 42 and port A of the coupler 44 is an even number of wavelengths of the light signal $I_1$. Under these circumstances the signal applied to the piezoelectric crystal 46 will induce a 180° or $\pi$ phase shift between the signals $I_4$ and $I_5$. The resulting signal $I_6$, which appears at port B of the coupler 44, is a composite of $I_6 (I_4)$ shown in dashed lines in FIG. 7d and $I_6 (I_5)$ shown in FIG. 7e, that is, a composite of the uncoupled, delayed signal $I_4$ and the coupled signal $I_5$. These signals, as shown in FIGS. 7d and 7e, are in phase, and thus will constructively add at port B of the coupler 44, yielding the signal shown in FIG. 7f. Similarly, the signal at port D of the coupler 44, $I_7$, is a composite of the coupled portion of the delayed signal $I_4$, $I_7 (I_4)$, shown in dashed lines in FIG. 7g, and the uncoupled portion of the signal $I_5$, that is, $I_7 (I_5)$. These signals are out of phase 180° and thus, with a 180° phase shift imposed by the piezoelectric crystal 46, no signal will appear at the output $I_7$.

From the preceding description, it can be seen that, by applying a changing voltage potential to the piezoelectric crystal 46, the input signal $I_1$ at port A of the coupler 42 can be made to appear, selectively, at either port B or port D of the coupler 44, as an output. Alternatively, since the switch shown in FIG. 6 is reciprocal, signals which are applied to the ports B or D of the coupler 44 may be selectively output at port A of the coupler 42. Furthermore, while the extremes have been described, that is, the total cancellation at one of the ports B or D of the coupler 44 and constructive addition at the remaining port, the introduction of a phase shift between 0° and 180° at the piezoelectric crystal 46 will yield outputs at the ports B and D of the coupler 44 varying in proportion to one another. Thus, for example, if the fiber 12a is stretched by the piezoelectric crystal 46 to a length which is $\pi/2$, or 90° of the signal wavelength, the input signal at port A of the coupler 42 will be split between the output ports B and D of the coupler 44.

Figure 8:
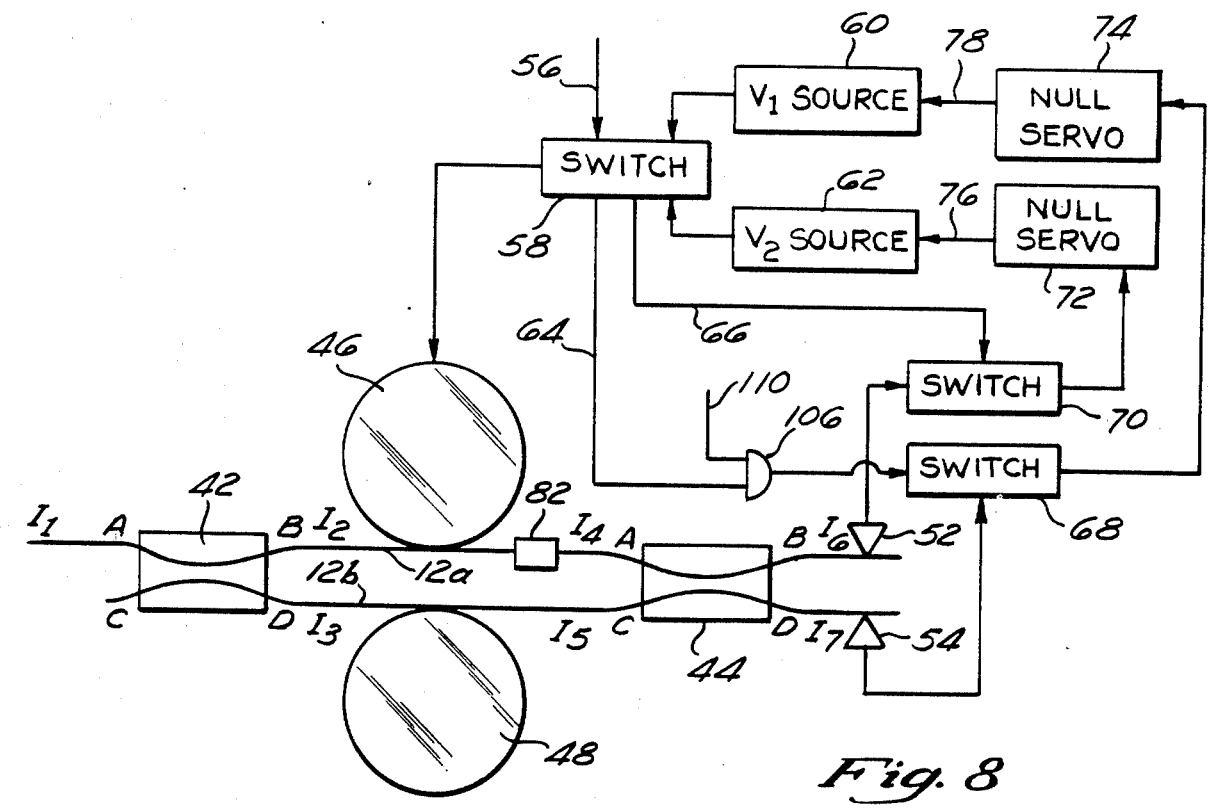
FIG. 8 is a schematic representation of an electrical control circuit used for supplying electrical signals to the optical switch of this invention.

Referring now to FIG. 8, a feedback system is shown which may be utilized to provide the voltage signals used for driving the piezoelectric crystal 46 to operate the switch of FIG. 6 between its two extreme positions, that is, to provide an output signal alternatively at port B or port D of the coupler 44.

A pair of sensors 52 and 54 are connected to the optical fibers 12a and 12b adjacent the ports B and D of the coupler 44. These sensors may be, for example, photodiodes which are mounted adjacent a bend in the optical fibers 12a and 12b or may be a photodiode located at a point on the fibers 12a and 12b where the cladding has been polished sufficiently to permit escape, and thus monitoring, of a small portion of the light transmitted by the fibers. The sensors 52 and 54 thus provide a means for monitoring the light level at ports B and D of the coupler 44.

An input signal on a line 56 is used to control the switchable coupler by controlling a switch 58 which alternatively conducts a voltage signal from a first voltage source 60 or a second voltage source 62 to the piezoelectric crystal 46. As will be seen from the description provided below, the voltage source 60 provides a voltage level $V_1$ sufficient to stretch the optical fiber 12a wrapped around the piezoelectric crystal 46 to introduce a half wavelength net relative delay in the light transmitted by the fiber 12a between port B of the coupler 42 and port A of the coupler 44, so that the light signal $I_1$ input at port A of the coupler 42 will constructively add at port B of the coupler 44 but will destructively interfere at port D of the coupler 44 in the manner previously described. The voltage source 62 provides a voltage signal $V_2$ which produces effectively no net relative delay at the piezoelectric crystal 46, so that the light signals $I_4$ and $I_5$ bear the same relative phase relationship as the light signals $I_2$ and $I_3$, shown in FIGS. 7b and 7c. The term "net relative" delay means the effective phase difference between uncoupled light on the fibers 12a and 12b. That is, "no net relative delay" means that the length of the optical fiber 12a between the interaction region of the coupler 42 and the interaction region of the coupler 44 differs from the length of the optical fiber 12b between these interaction regions by an amount $N\lambda$, where N is an integer (including 0), and $\lambda$ is the wavelength of the light signal $I_1$. Similarly, "half wavelength net relative delay" means that the difference in length of the fibers 12a and 12b between the interaction regions of the couplers 42 and 44 is $N\lambda + \frac{1}{2}\lambda$, where N and $\lambda$ are defined as stated above.

The switch 58 also provides a pair of output control signals on a pair of lines 64 and 66 to operate a pair of slave switches 68 and 70, respectively. When the switch 58 conducts the voltage signal $V_1$ from the source 60 to the piezoelectric crystal 46, the switch 68 is closed, while the switch 70 is opened. Alternatively, when the source 62 provides the voltage signal $V_2$ to the piezoelectric crystal 46, the switch 70 is closed while the switch 68 is opened. The switch 70 connects the photosensor 52 to a null servo 72 while the switch 68, when closed, connects the photosensor 54 to a null servo 74.

The switches 58, 68, and 70 are typically solid state switching devices and the null servos 72 and 74 are prior art devices which provide an output signal on their output lines 76 and 78, respectively, which is a variable DC voltage feedback signal used to adjust the input signal to the servos 72 and 74 to a null condition.

Thus, when the switch 58 conducts the output of the source 60 to the piezoelectric crystal 46, all of the input light signal $I_1$ should be coupled to the output $I_6$, since the voltage $V_1$ is intended to stretch the fiber 12a by one-half wavelength. When the switch 58 is in this position, the photosensor 54, through the switch 68, provides at the input to the null servo 74, a signal which represents the light level of the signal $I_7$ at port D of the coupler 44, which should be zero. The null servo 74 adjusts the output signal 78 and, in turn, the voltage $V_1$ of the source 60 in a manner necessary to make the light output at port D of the coupler 44 zero.

Similarly, when the switch 58 conducts the output voltage $V_2$ from the source 62 to the piezoelectric crystal 46, the switch 70 permits the null servo 72 to monitor the light output at port B of the coupler 44 by monitoring the output of the photosensor 52. In this position of the switch 58, the null servo 72 will provide an output signal 76 to adjust the voltage source 62 to provide zero output at port B of the coupler 44.

The switches 68 and 70 assure that each of the servos 72 and 74 will receive an input signal only when the input signal on line 56 to the switchable coupler indicates that a null output should exist at the respective photodetector 54 or 52. In this manner, regardless of the wavelength of the signal $I_1$, the system will automatically adjust the output voltage provided to the piezoelectric crystal 46 to assure switching between ports B and D of the coupler 44. It will be understood that when the switch 70 is non-conductive, the null servo 72 will receive no light output signal and will thus provide a constant output signal on line 76 to maintain the current adjustment of the source 62. Thus, the signals 76 and 78 are only adjusted by the servos 72 and 74, respectively, when a non-null signal is provided by the photodetectors 52 and 54 in the operational mode where these photodetectors should provide a null output.

In order to assure complete switching of the light output between ports B and D of the coupler 44, the polarization of the waves from the ports B and D at the input to the coupler 44 must be identical. Without this identical polarization, complete additive or destructive interference cannot be accomplished. Therefore, it may be advantageous to include a polarization controller 82 to one of the fibers 12a, 12b to adjust the polarization to match that of the other fiber. The polarization controller 82 may be constructed in accordance with the teachings of U.S. Pat. No. 4,389,090, issued 6-21-83 entitled "Polarization Controller", which is hereby incorporated herein by reference.

From the preceding description, it will be seen that this switchable coupler provides a means for switching an input light signal at port A of the coupler 42 to either of two output optical fibers at ports B and D of the coupler 44. Alternatively, because of the reciprocal nature of this device, the switchable coupler will couple an input light signal on either port B or port D of the coupler 44 to port A of the coupler 42.

What is claimed is:

1. An optical switch for switching light from a light source, comprising:
   first and second optical couplers, each comprising first and second optical fibers relatively positioned to provide partial light coupling therebetween, said first and second optical fibers of said first coupler being optically connected, respectively, to said first and second optical fibers of said second coupler by first and second intermediate fiber optic segments; and
   means for varying the optical path length in said first intermediate fiber optic segment to introduce a variable phase shift to light transmitted between said first optical fiber of said first optical coupler and said first optical fiber of said second optical coupler.

2. An optical switch, as defined in claim 1, wherein said variable phase shift causes light to selectively interfere within said second coupler, so that said second coupler selectively supplies a major portion of that light which is input to said first optical fiber of said first coupler to either said first or second optical fiber of said optical coupler.

3. An optical switch, as defined in claim 1, wherein said first and second optical fibers of each of said first and second optical couplers comprise single mode optical fibers.

4. An optical switch, as defined in claim 3, wherein said first and second optical couplers provide evanescent field coupling between said first and second optical fibers.

5. An optical switch, as defined in claim 1, in which each of said first and second optical couplers has a coupling efficiency of 50%.

6. An optical switch, as defined in claim 5, wherein said variable phase shift selectively provides constructive and destructive interference at said first or second optical fiber of said second optical coupler, respectively.

7. An optical switch, as defined in claim 1, additionally comprising:
   means for adjusting said variable phase shift in accordance with the wavelength of light supplied to said optical switch.

8. An optical switch, as defined in claim 7, additionally comprising:
   means for sensing the level of light on said second optical fiber of said second optical coupler and providing a feedback signal to said adjusting means.

9. An optical switch, as defined in claim 8, wherein said means for adjusting said variable phase shift adjusts said phase shift in accordance with said feedback signal to adjust the output light level at said second optical fiber of said second optical coupler to zero.

10. A method of switching an optical signal on a first optical fiber segment to either of a second and third optical fiber segment, comprising:
    splitting said optical signal on said first optical fiber segment for transmission of a first portion of said optical signal on a fourth optical fiber segment and transmission of a second portion of said optical signal on a fifth optical fiber segment;
    varying the optical path length in said fourth optical fiber segment to introduce a variable phase delay to said first portion of said optical signal to produce a variably delayed first portion; and
    splitting said second portion and said variably delayed first portion and transmitting a sub-portion of each on said second and third optical fiber segments.

11. A method of switching an optical signal, as defined in claim 10, wherein said step of introducing a variable phase delay comprises stretching said fourth optical fiber segment.

12. A method of switching an optical signal, as defined in claim 11, wherein said stretching step is accomplished by supplying a voltage to a piezoelectric crystal attached to said fourth optical fiber segment.

13. A method of switching an optical signal, as defined in claim 10, additionally comprising:

sensing the optical signal level on said third optical fiber segment; and controlling said variable phase delay in accordance with said sensed optical signal level.

14. A method of switching an optical signal, as defined in claim 10, wherein said sub-portions of said second portion and said variably delayed first portion constructively interfere on said second optical fiber segment and destructively interfere on said third optical fiber segment.

15. A method of switching an optical signal, as defined in claim 10, wherein said step of splitting said optical signal comprises evanescent field coupling of a portion of said optical signal on said first optical fiber segment onto said fifth optical fiber segment.

16. A method of switching an optical signal, as defined in claim 15, wherein said evanescent coupling couples 50% of said optical signal on said first optical fiber segment onto said fifth optical fiber segment.

17. A method of switching an optical signal from a first optical fiber segment to either of second and third optical fiber segments, comprising:

splitting said optical signal into first and second fractional signals carried by fourth and fifth optical fiber segments;

varying the optical path length of said fourth optical fiber segment to introduce a variable delay to said first fractional signal to produce a first delayed fractional signal;

splitting said second fractional signal on said fifth optical fiber segment into first and second partial signals;

splitting said first delayed fractional signal on said fourth optical fiber segment into third and fourth partial signals;

combining said first and third partial signals in said second optical fiber segment; and combining said second and fourth partial signals in said third optical fiber segment.

* * * * *